Jan. 20, 1959         H. AMOS ET AL         2,870,054
METHOD AND APPARATUS FOR FABRICATING HOLLOW
BODIES AND SHEETS OF PLASTIC MATERIAL
Filed Aug. 5, 1954                        10 Sheets-Sheet 10
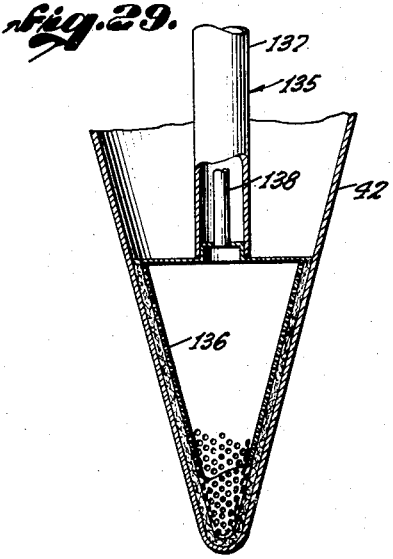
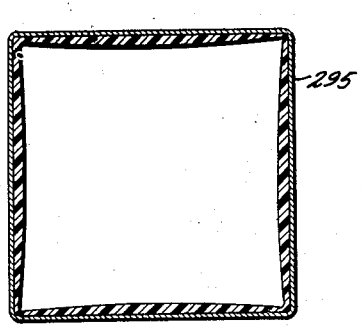
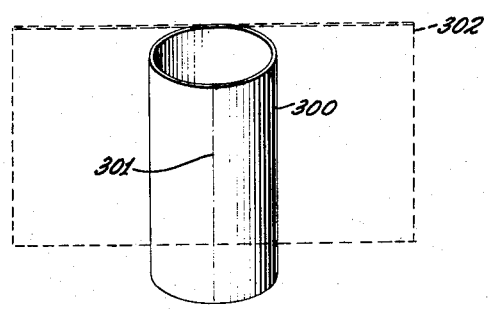
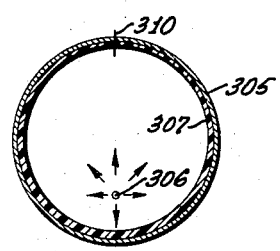
HOMER AMOS &
EDWARD T. STRICKLAND,
INVENTORS.
BY
ATTORNEY.

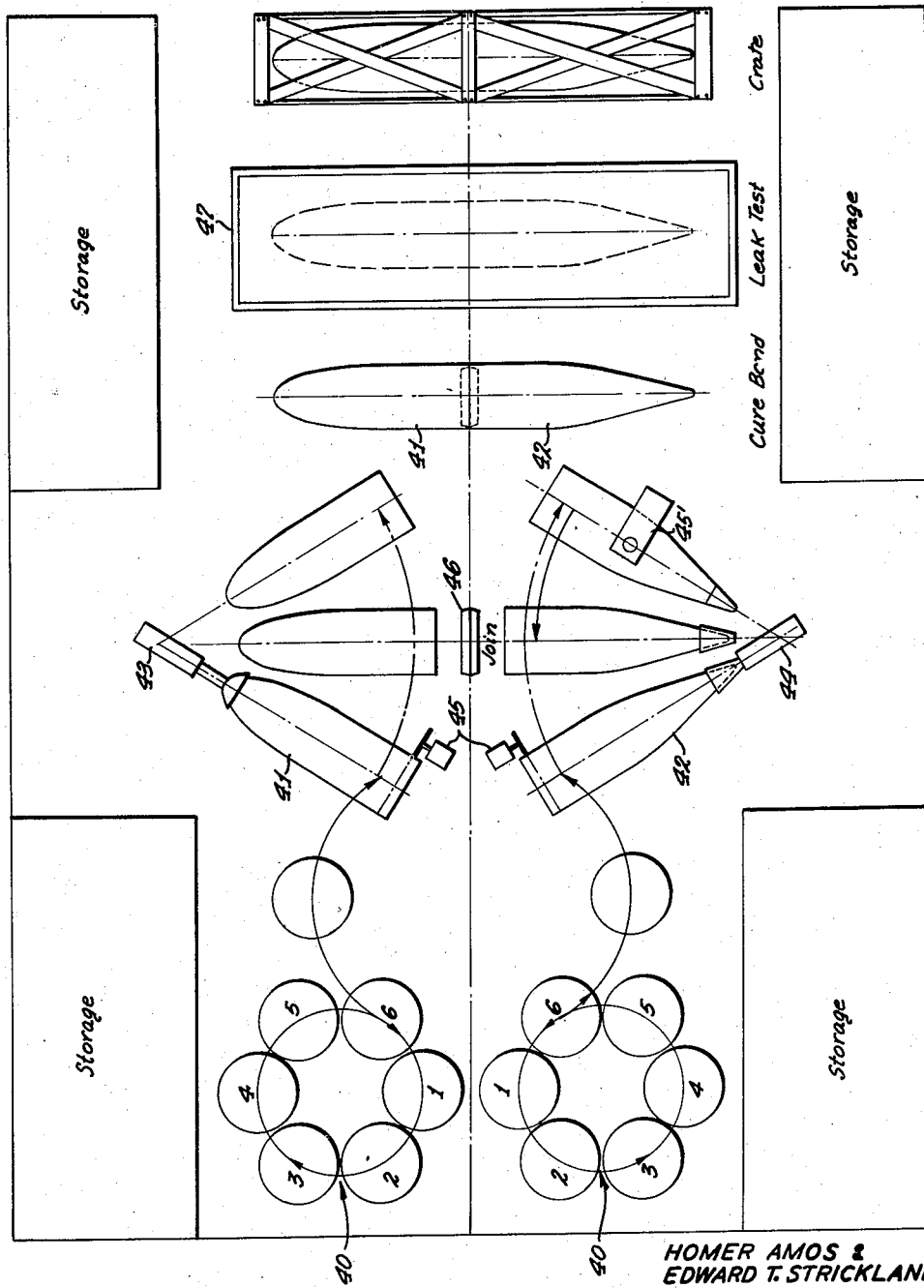

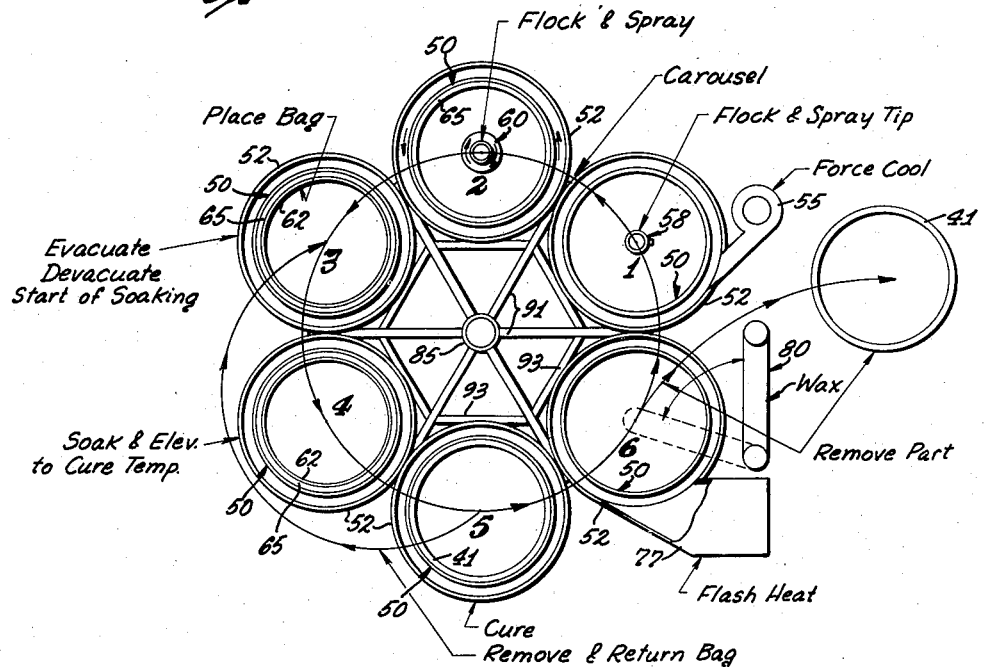
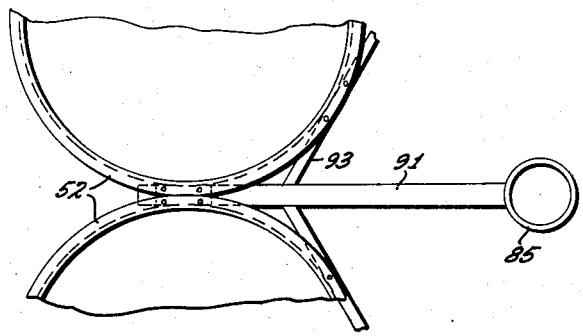

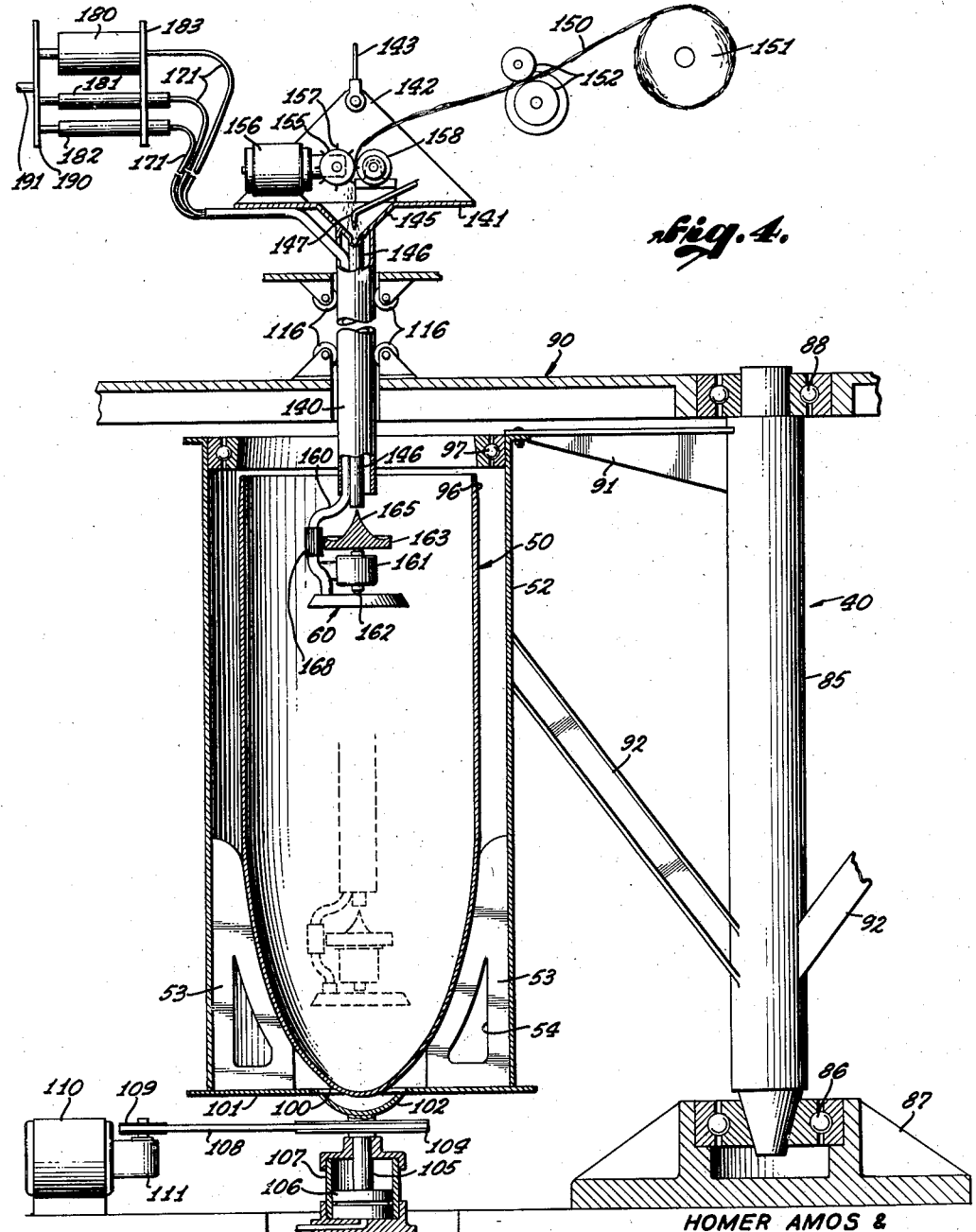

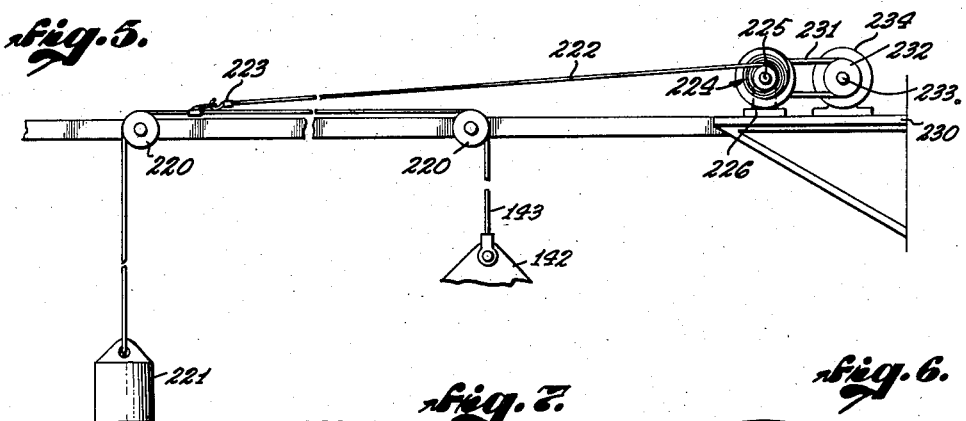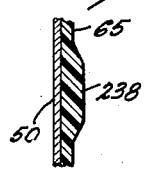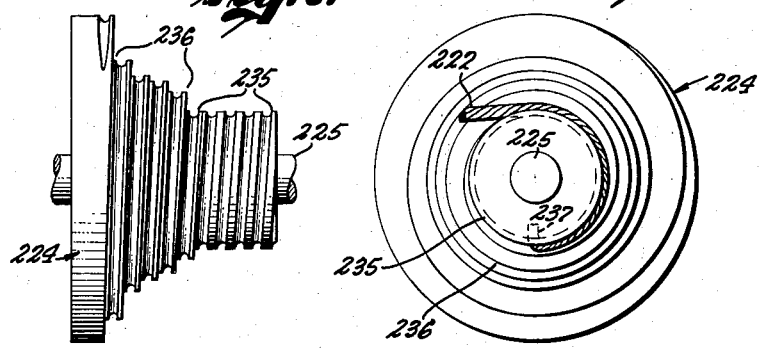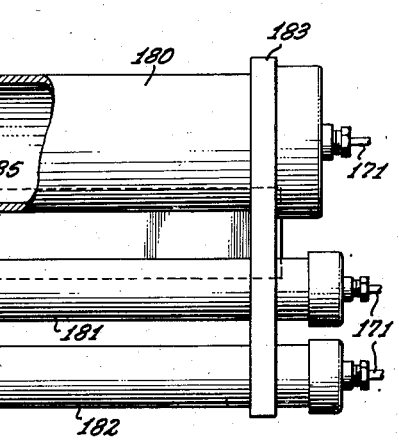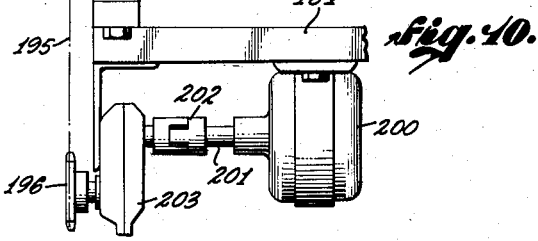

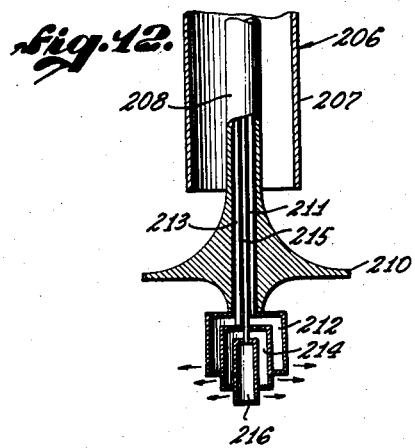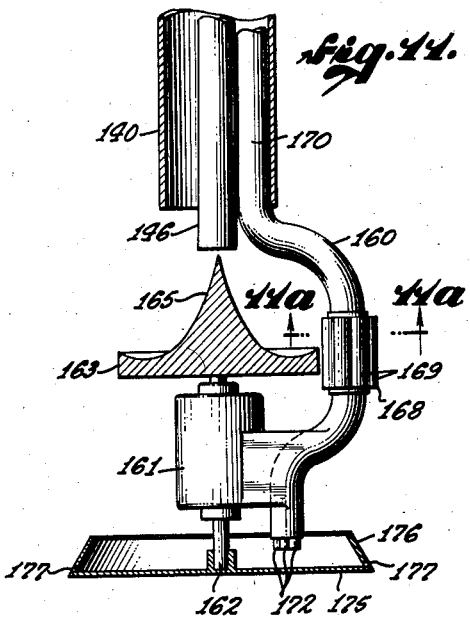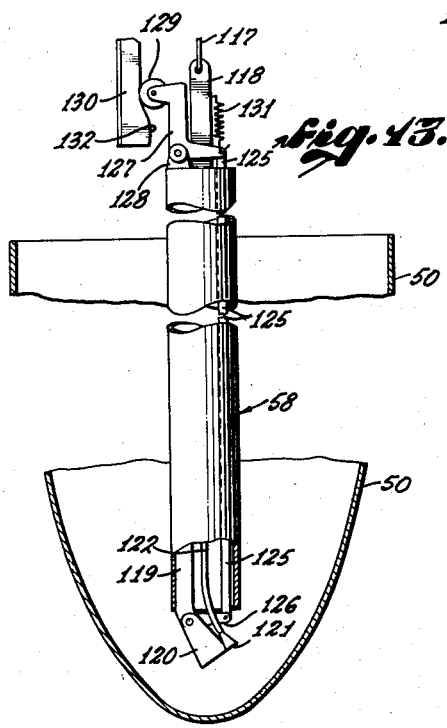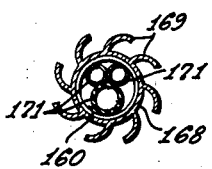

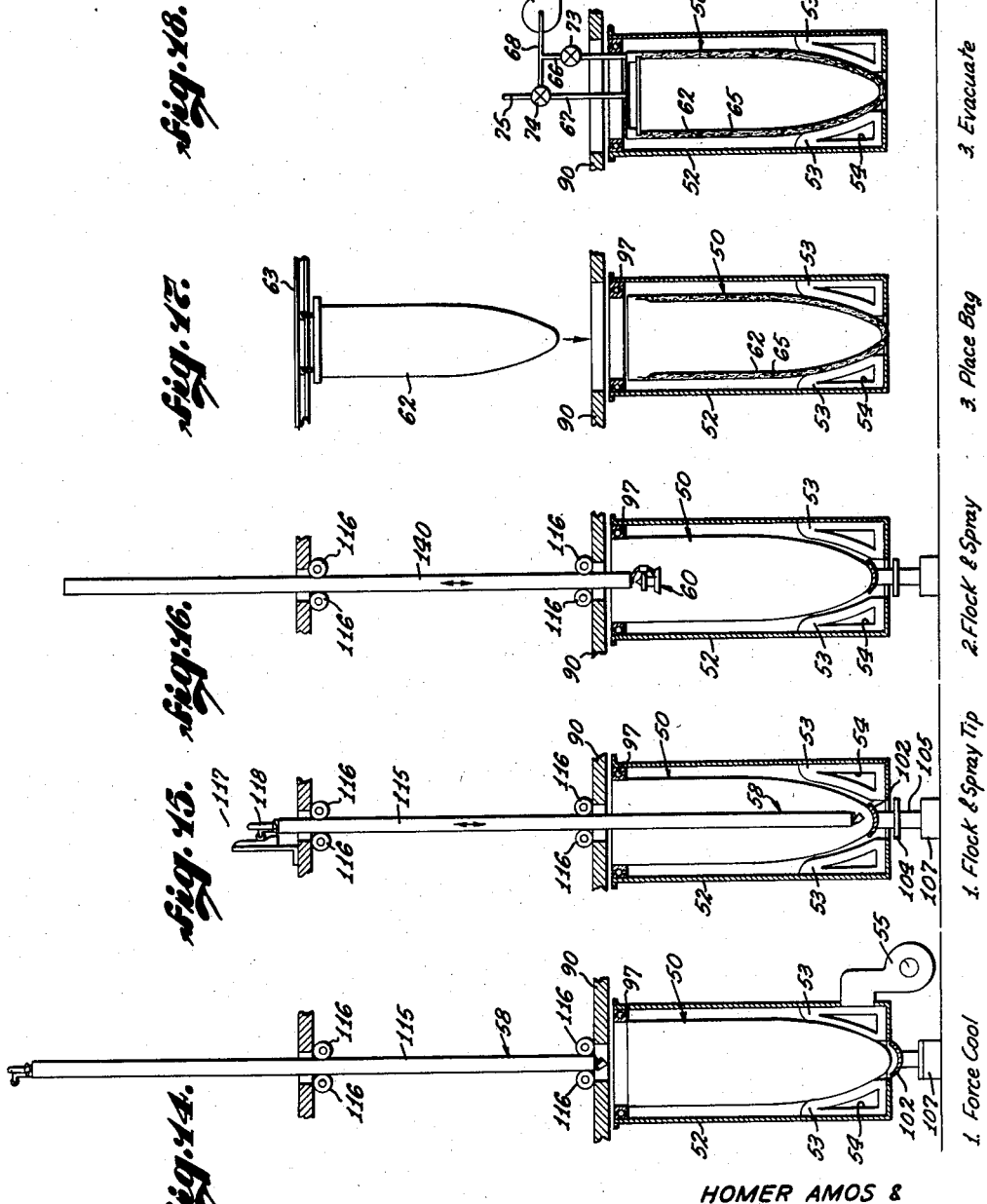

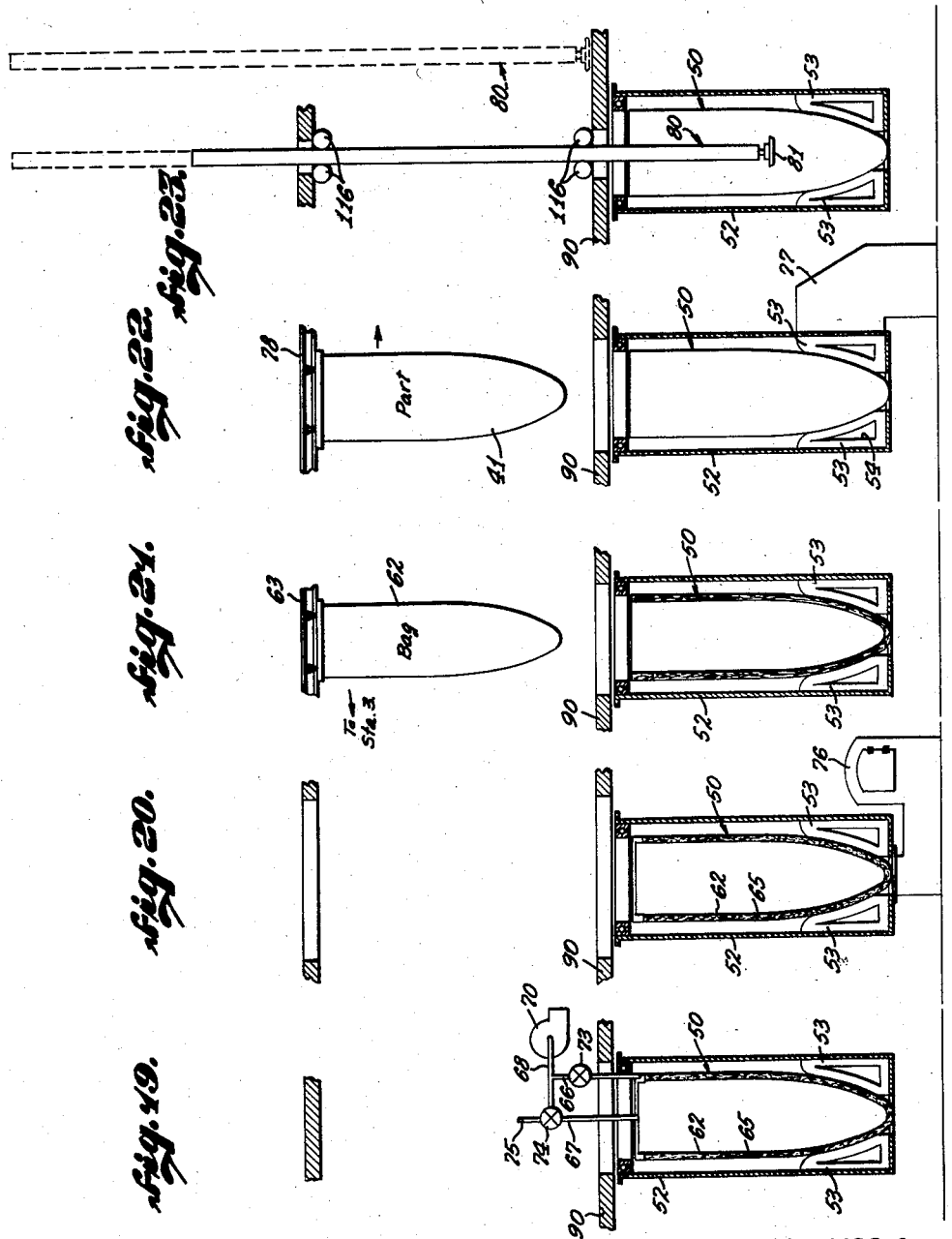

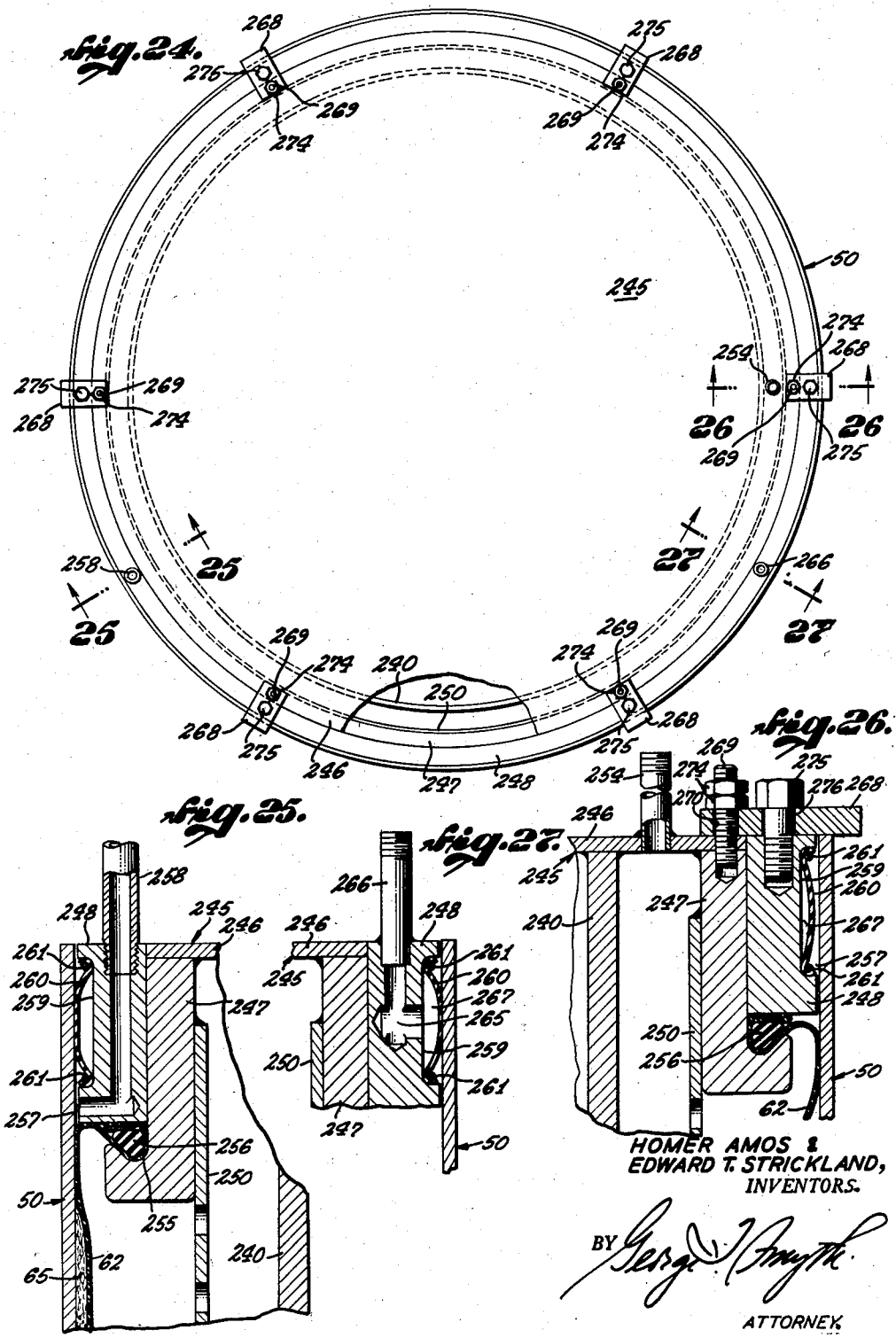

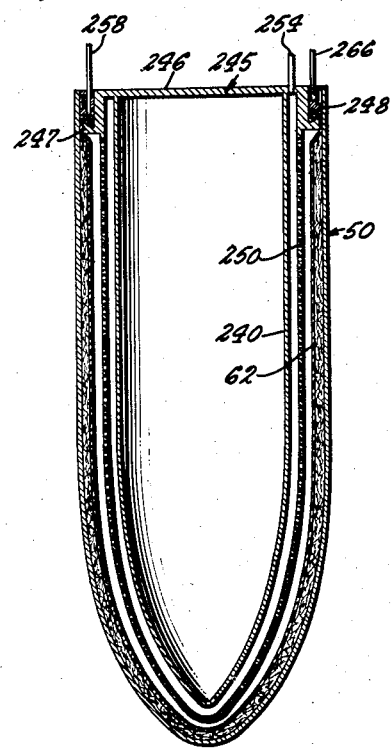
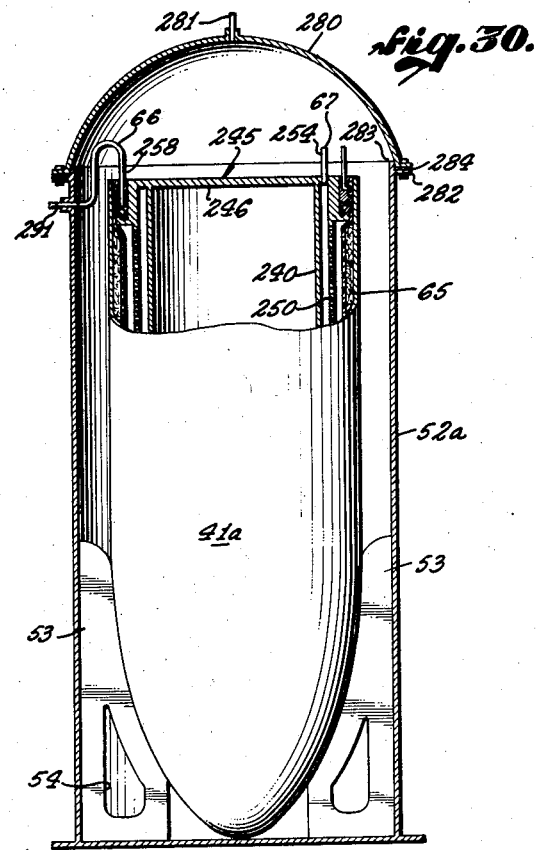

United States Patent Office 2,870,054
Patented Jan. 20, 1959

2,870,054

METHOD AND APPARATUS FOR FABRICATING HOLLOW BODIES AND SHEETS OF PLASTIC MATERIAL

Homer Amos, Manhattan Beach, and Edward T. Strickland, Playa del Rey, Calif., assignors to Pastushin Aviation Corporation, Los Angeles, Calif., a corporation Application August 5, 1954, Serial No. 448,064

13 Claims. (Cl. 154—83)

This invention is directed to a process and apparatus for carrying out the process to produce hollow bodies and sheets of plastic material. While the invention may be used advantageously for fabricating such bodies and sheets out of plastic materials alone, it has special utility for producing such articles in which the plastic material is strengthened by embedded filamentous reinforcement material.

It will be readily appreciated that various plastic materials, both thermoplastic and thermosetting, may be used in various practices of the invention and various types of filamentous reinforcement material may be embedded in the plastic. Initially the invention is being applied to the production of fuel tanks made of polyester resin reinforced with glass fibers, the fuel tanks being intended to be jettisoned when empty. This particular practice of the invention will be described herein by way of disclosure and will provide for those skilled in the art, adequate guidance for applying the invention to the application of other specific products.

It has long been desirable to produce disposable fuel tanks of this general type of plastic material thereby to avoid the use of metals and to provide a tank structure that will become completely worthless upon impact with the ground. Heretofore, however, no method of fabricating a hollow plastic body of this character has been found practical that will meet the strict and exacting requirements for this particular product. Such a plastic fuel tank must be light in weight and yet completely reliable both with respect to leakage and with respect to the withstanding of the high-magnitude stresses engendered in flight. Such lightness combined with strength can be achieved with reliability by embedding strong filamentous material in the plastic and it is well-known that polyester resin reinforced by glass fibers is stronger than steel in proportion to its weight.

The problems involved in the production of such a plastic fuel tank for military usage are: first, to obtain proper distribution of the filamentous reinforcement material in the plastic with the filaments extending in random direction in interlaced relationship; second, to produce a high density shell structure free from occluded gases and vapors; third, to provide for local thickening of the wall of the shell in regions where concentrated stresses can be expected; fourth, to provide an economical method of producing such shells in quantity with a minimum percentage of rejects; and, fifth, to minimize inspection expense. Inspection is especially important because a failure of such a tank in flight may mean loss of life in addition to loss of an airplane. Inspection costs commonly approach the total of all other costs in the fabrication of a metal fuel tank for military use.

These problems with their many aspects are not met by the standard flocking procedure heretofore used to produce such hollow bodies. In the prevailing prior art procedure, a hollow perforated form of the desired configuration is placed in a plenum chamber with a pump connected to the interior of the hollow form to draw a vacuum therein. The flock, which usually consists of short fibers on the order of an inch and a half in length, are blown into the plenum chamber and are drawn by airflow to the perforate form to build up a layer of flock thereon. While the vacuum is still in effect to hold the flock in place, a suitable binder is sprayed over the fibrous layer and then the assembly is baked to cure the binder.

After the binder is cured, the resulting pre-form may be handled freely for further processing. A suitable resin is then poured onto the pre-form to a desired thickness and the pre-form is then placed on a die, usually a male die. A second complementary die is applied to carry out the final molding process under pressure in the presence of heat to cure the plastic material.

One disadvantage of this prior art procedure is that the fibers do not form a layer of uniform thickness on the pre-form in the plenum chamber. It requires experimentation to arrive at an acceptable baffle arrangement and good distribution of the fibers is never actually attained. As a result, the product is not of uniform strength as required in a disposable fuel tank for an airplane.

Another disadvantage of the standard procedure is that there is no provision for varying the thickness of the walls of the product under close control. In the construction of a plastic fuel tank, it is highly desirable to make the major portions of the wall of the tank relatively thin to save weight and to make selected portions of the wall of the tank relatively thick to withstand concentrated stresses.

The prior art procedure is also disadvantageous in that it requires the application of a binder in addition to the usual resin. Additional labor is involved in the separate step of applying the binder to the accumulated flock on the pre-form and additional labor is also involved in the application of heat to cure the binder in advance of the application and curing of the resin.

One of the most serious objections to the standard procedure is in the use of male and female dies for the pressure molding of a pre-form in which the thickness of the wall of the pre-form is not under close control. In some regions the wall of the pre-form is thinner than desired so that the material of the pre-form is not subjected to the desired molding pressure; in other regions the wall of the pre-form is thicker than desired and the closing action of the two molds causes local spreading or lateral displacement of the material. Too often, the result is deficiency of the flock in one region and bunching of the flock in an adjacent region. It is also apparent that when two complementary molds are used, any departure of the configuration of the pre-form from the configuration of the two molds will result in displacement and distortion of the material. For these reasons, even if satisfactory distribution of a flock is achieved in the initial deposit of the flock on the perforated form, the desired distribution may be spoiled by lateral displacement of the flock under the pressure of the cooperating male and female dies.

It is further apparent that this prior art procedure does not lend itself to rapid and economical assembly-line production of hollow objects. An excessive number of steps are involved and excessive handling is required in the course of the process. Moreover, the necessary equipment for carrying out the prior art flocking procedure does not lend itself to quantity production techniques.

The present invention, which meets all the stated problems, is characterized by the use of a hollow mold and the concept of directing a stream of the reinforcement flock onto the inner surface of the mold while the mold is rotating at a rate to cause the flock to be immobilized thereon by centrifugal force and by frictional engagement of the flock filaments both with each other and with the wall of the mold. While the mold is still rotating with the immobilized deposited flock thereon, the flock layer is wetted with liquid polyester resin. The volatile components of the resin are permitted to vaporize and then the resin is cured with or without heat. Usually heat is used to shorten the curing period.

The invention is further characterized by the application of a vacuum to withdraw condensible and non-condensible gases from the resin-flock layer, and, while the layer is still under a vacuum, heat and pressure are applied for the final cure. This use of a vacuum and the application of pressure to cure the layer with gases and vapors removed therefrom, results in a non-porous shell structure that is of high-density and is completely free from entrapped bubbles.

While all of the steps of the present process may be carried out by hand, the preferred practice of the invention is carried out by apparatus that is largely automatic and provides for continuous production by an assembly-line procedure. The specific features and advantages of the method and apparatus of the invention will be apparent in the following detailed description and in the accompanying drawings.

In the drawings, which are to be regarded as merely illustrative:

Figure 1 is a diagram showing how apparatus including a pair of carrousels may be used for an assembly-line procedure for the quantity production of disposable airplane fuel tanks;

Figure 2 is a diagrammatic plan view of one of the carrousels;

Figure 3 is an enlarged fragmentary portion of Figure 2;

Figure 4 is a view in side elevation and in section of a portion of a carrousel, including one of the molds thereon;

Figure 5 is a side elevation of an arrangement for controlling the vertical movements of means for depositing material on the inner surface of the rotating molds;

Figure 6 is an end elevation of a cable-winding member in Figure 5;

Figure 7 is a side elevation of the same cable-winding member;

Figure 8 is a fragmentary sectional view showing how a shell produced by the new process may be formed with a thickened portion constituting, in effect, an inner circumferential reinforcement rib;

Figure 9 is an enlargement in side elevation of fluid-metering means shown in Figure 4;

Figure 10 is a fragmentary sectional view of the metering means taken as indicated by the lines 10—10 of Figure 9;

Figure 11 is an enlarged detail of Figure 4 showing means for directing streams of material onto the inner surface of the rotating mold;

Figure 11a is a sectional view of a rotary sleeve taken as indicated by the line 11a—11a of Figure 11;

Figure 12 is a view similar to Figure 11 showing an alternate means for depositing material on the inner surface of a rotating mold;

Figure 13 is a view partly in section and partly in side elevation showing means which may be employed for depositing material on the inner surface of the closed tapered end of a rotating mold;

Figures 14 through 23 are diagrammatic views, partly in side elevation and partly in section, illustrating the steps that may be carried out at the various stations in the rotation of one of the carrousels of Figure 1;

Figure 24 is a plan view of means which may be used at one of the carrousel stations for handling a flexible bag and for releasably connecting the bag to a mold during a portion of the journey of the mold in a rotation of a carrousel;

Figure 25 is an enlarged section taken as indicated by the line 25—25 in Figure 24;

Figure 26 is an enlarged section taken as indicated by the line 26—26 in Figure 24;

Figure 27 is an enlarged section taken as indicated by the line 27—27 of Figure 24;

Figure 28 is a longitudinal sectional view of a mold with a flexible bag positioned therein by the structure shown in Figures 24 to 27;

Figure 29 is a view partly in side elevation and partly in section showing means that may be employed in one practice of the invention to deposit material in the conical end of a mold;

Figure 30 is a longitudinal sectional view similar to Figure 28 showing how the bag-positioning structure of Figures 24–27 may be employed inside a bell jar structure to permit the use of a thin-walled mold;

Figure 31 is a transverse sectional view of a non-circular mold with material deposited on the inner surface of the mold in the manner taught by the present invention;

Figure 32 is a diagram showing how a flat sheet may be produced in one practice of the invention by first forming a cylinder and then cutting and flattening the cylinder; and Figure 33 is a transverse sectional view similar to Figure 31 showing how the invention may be practiced with eccentric rotation of a cylindrical mold.

GENERAL ARRANGEMENT OF THE PROCESS AND APPARATUS FOR THE CONTINUOUS PRODUCTION OF PLASTIC FUEL TANKS

In the example of the process selected for the present disclosure, it is contemplated that the fuel tank will be made in two sections and that two conveyor means will be employed for assembly-line production of the two sections separately. The resulting tank sections are delivered to an assembly section where the tank sections are trimmed and equipped with the desired fittings. Two sections are then joined with suitable bonding material to make a complete tank, and after the bonding material used for this purpose has been cured, the completed tank is first tested for leaks and then crated for shipment.

In the particular apparatus for this purpose, that is illustrated diagrammatically in Figure 1, the two conveyors comprise two carrousels 40 each of which carries six molds and each of which is rotatable to carry the molds to six processing stations in sequence. The resulting two tank sections 41 and 42 are delivered from the sixth station of the carrousel to an assembly area where the two tank sections are engaged respectively by jigs or holding devices 43 and 44. These holding devices may operate in the manner of suction cups to grip the ends of the tank sections as shown.

In the assembly area, the tank sections 41 and 42 are first trimmed by a power-actuated rotary cutter 45 and then the two tank sections are swung to a far position where holes are made in the two tank sections as required and where the usual tank fittings are installed. Thus, Figure 1 shows a machine tool designated 45' for cutting openings in one of the tank sections.

The two tank sections are then swung back to an intermediate position and a suitable ring member 46 is positioned between the open ends of the two tank sections for the purpose of joining the sections together. The ring member may be beveled or conically tapered in opposite directions as shown to permit the two tank sections to telescope onto the ring member with the rims of the two sections abutting in the finished tank. Suitable plastic material having the required adhesive properties may be used to bond the two tank sections 41 and 42 to the ring member 46 and the assembled tank may be moved to a curing station shown in Figure 1 where heat is applied to cure the bond. The completed tank may then be immersed in water in a tank 47 to test for leaks, the tank being placed under air pressure for this purpose. The tank is then ready to be crated at a final station shown in Figure 1.

As shown diagrammatically in Figures 14 to 23, each of the six stations of the carrousel is provided with a hollow mold generally designated by numeral 50 which has a closed tapered lower end, the mold being of the configuration of one of the sections of the finished tank. The hollow mold 50 is surrounded by a cylindrical shroud 52 which may be equipped with four radial plates 53 to form an open seat for holding the mold 50 upright. Preferably each of the four plates 53 has a relatively large aperture 54 therein to permit free circulation of air inside the shroud.

At the first carrousel station, as indicated in Figure 14, a suitable blower 55 directs a stream of air into the shroud 52 to cool the mold 50 therein in preparation for the repetition of a fabrication cycle. Also at the first carrousel station, as indicated in Figure 15, a dispensing device, generally designated 58, is inserted into the mold from above for the specific purpose of depositing flock and liquid resin in the tapered end portion only of the mold. The mold 50 is rotated on its longitudinal axis at a sufficiently high rate to compact the deposited material and to hold the same in place on the inner surface of the mold by centrifugal force. The dispensing device 58 first blows a stream of flock onto the mold surface and then directs a stream of the liquid resin onto the deposited flock, or both actions may occur simultaneously.

At the second carrousel station, the mold 50 is rotated for the same purpose and a second dispensing device, generally designated 60, is lowered into the mold to complete the lining of the mold with a layer of flock wetted by liquid resin. The dispensing device 60 blows flock radially outward onto the inner surface of the mold and simultaneously sprays liquid resin radially outward, the device 60 moving axially of the rotating mold for distribution of the material over the mold surface. While in all instances deposition of the flock on the inner surface of the rotating mold either in advance of the application of the liquid resin or simultaneously therewith is prefered, the resin may be delivered to the mold surfaces prior to the deposition of the flock since the liquid resin will be drawn into the subsequently deposited flock by capillary action. The liquid resin is given time to permeate the flock thoroughly at the second station and the flock-resin layer has sufficient inherent strength to maintain its configuration when rotation of the mold is stopped for further processing at the third carrousel station.

Associated with each of the carrousels is a plurality of flexible bags 62, each of which is of a configuration to nest inside a mold 50. It is contemplated that the bags 62 will be lowered into the successive molds at the third station as indicated in Figure 17 and will be withdrawn from the molds at the fifth station as indicated in Figure 21. To facilitate this cycle of movement on the part of the bags 62, an overhead conveyor rail 63 is provided and as the bags are successively withdrawn from the molds at the fifth carrousel station, they are transported along the conveyor rail 63 back to the third carrousel station.

When a bag 62 is lowered into a mold 50 at the third carrousel station, means is provided both to seal off the interior of the bag from the atmosphere and to connect the rim of the bag with the surrounding mold in fluid-tight manner. The joining of the rim of the bag with the mold seals off an annular space between the bag and the mold that encloses the flock-resin layer 65 on the inner surface of the mold. This sealed space around the bag is then evacuated to withdraw air and vapors from the flock-resin layer 65. At the same time the interior of the bag is evacuated to keep atmospheric pressure from expanding the bag into pressure contact with the flock-resin layer and thus interfering with the escape of air and vapors from the layer. As indicated in Figure 18, the sealing structure that is associated with the bag 62 has a conduit 66 communicating with the annular space between the bag and the mold and has a second conduit 67 communicating with the interior of the bag. The two conduits 66 and 67 are connected by a third conduit 68 with the intake of a suitable vacuum pump 70. The conduit 66 has a suitable cut-off valve 73 therein and the conduit 67 is connected to the conduit 68 by a three-way valve 74, which valve is also connected to a conduit 75 for communication with the atmosphere. It is apparent that with the valve 73 open and with the valve 74 connecting conduit 67 with conduit 68, operation of the vacuum pump 70 will evacuate the two zones inside and outside the bag 62.

While the mold is still at the third carrousel station and after ample opportunity has been given for withdrawal of air and vapors from the flock-resin layer 65, the three-way valve 64 is operated to place the interior of the bag in communication with the atmosphere. As indicated in Figure 19, air rushes in to expand the bag and thereby place the flock-resin layer 65 under pressure in preparation for the cure. Valve 73 may be closed to maintain the vacuum in the space surrounding the bag during the cure or, if necessary because of leakage, the valve 73 may remain open and the vacuum pump 70 may continue to operate throughout the curing period.

With the bag 62 expanded into pressured contact with the flock-resin layer 65 and with the flock-resin layer still under vacuum, the mold is moved to the fourth carrousel station and a suitable heater 76 is connected with the interior of the shroud 52, as shown in Figure 20, to supply sufficient heat to the mold to cure the resin. The resin applied at the first and second carrousel stations has ample opportunity to penetrate the flock prior to the application of the curing heat. The curing of the flock-resin layer 65 by residual heat continues as the mold 50 moves to the fifth carrousel station. The space between the bag 62 and the mold 50 is then devacuated and the bag is removed as indicated in Figure 21.

At the sixth carrousel station, as indicated in Figure 22, suitable means such as a furnace 77 is connected to the housing 52 for flash heating of the mold 50 to cause the mold to rise to a relatively high temperature with sufficient rapidity to cause the mold to expand away from the cured flock-resin layer 65 without undue heating of the flock-resin layer. The finished tank section, in this instance tank section 41, is then lifted out of the mold 50, as indicated in Figure 22, to permit the tank section to be carried along an overhead conveyor rail 78 to the assembly area. While the mold is still at the sixth carrousel station, a suitable dispensing device 80 is lowered into the mold 50. The device 80 has a rotary spray head 81 which coats the inner surface of the mold with a suitable parting agent in preparation for a repetition of the process cycle. This parting agent has the usual function of facilitating the separation of a subsequently fabricated tank section 41 from the mold. Thus separation of the molded product from the mold is facilitated in part by the parting agent and in part by thermal expansion of the mold.

Inspection of the molded product is simple since the polyester shell is semi-transparent and of the appearance of glass and any flaws are milky white and opaque. Flaws are usually the result of pin holes in the mold on bag and are characteristically of tree-shaped configuration. Such flaws are so conspicuous that a tank section can be inspected rapidly.

Carrousel construction

As shown in Figures 2, 3, and 4, each of the carrousels 40 includes a central vertical shaft 85 which is mounted by a thrust bearing 86 on a suitable base member 87. The upper end of the shaft is journalled in a second bearing 88, that is mounted in fixed upper structure, generally designated by numeral 90. The carrousel incorporates six of the cylindrical shrouds 52, which are supported from the vertical shaft 85 by upper radial arms 91 and by lower inclined arms 92. As shown in Figure 2, the upper radial arms 91 extend between the shrouds and these upper arms are interconnected to suitable tie members 93.

Each of the molds 50 is externally tapered around its rim as indicated at 96 in Figure 4 and the inner race of a ball bearing 97 at the upper end of the cylindrical shroud 52 is correspondingly tapered to receive the mold rim with a friction grip. It is contemplated that suitable means will be provided to lift the hollow mold out of its seat upward into engagement with the inner race of the ball bearing 97 and then to rotate the mold on its longitudinal axis with the mold stabilized by engagement with the ball bearing. Any suitable arrangement may be provided for lifting and rotating the mold.

In the construction shown in Figure 4, the shroud 52 has a central opening 100 in its bottom wall 101 and at each of the first and second carrousel stations, a suitable rotary lift member 102 is adapted for movement upward through the central opening 100 to engage the bottom of the mold and to lift the mold into engagement with the upper ball bearing 97. The rotary lift member 102 is a concave plate conforming to the configuration of the nose of the mold 50, the diameter of this plate being only slightly less than the diameter of the central opening 100. The normal down position of the lift member is relatively close to the central opening 100 as indicated in Figure 4 so that normally the lift member substantially closes the opening.

The rotary lift member 102 is unitary with a sheave 104 that is suitably journalled on a vertical piston rod 105. The piston rod 105 is carried by a suitable piston 106 inside an air cylinder 107 so that admission of compressed air into the bottom of the air cylinder will cause the piston to lift the rotary lift member 102 thereby to lift the mold 50 into engagement with the upper ball bearing 97. The sheave 104 is connected by a V-belt 108 with a drive sheave 109 and the drive sheave is actuated by a suitable motor 110 through a gear box 111.

It is apparent that admission of compressed air into the bottom of the air cylinder 107 to elevate the lift member 102 will result in engagement of the mold 50 with the inner race of the ball bearing 97 and that energization of the motor 110 will then rotate the mold the desired rate. The mold 50 may be rotated, for example, at approximately 300 R. P. M. It is further apparent that when the motor 110 is de-energized and compressed air is released from the cylinder 107, the mold will drop back to its normal seated position and the lift member 102 will retract downward to clear the bottom of the shroud in preparation for the next rotary movement of the carrousel.

*Means to deposit material at the first carrousel station to form the conical tip of a tank*

The problem of building up the flock-resin layer 65 in the closed tapered end of a tank section may be solved in various ways in various practices of the invention. In this instance, the tank sections 41 have relatively rounded or blunt closed ends and the tank sections 42 have relatively pointed closed ends. The dispensing device 58 shown in Figures 13 and 15 may be used to deposit the flock and resin in the blunter ends of the tank sections 41 and the device shown in Figure 29 may be used to deposit the material in the more pointed ends of the tank sections 42.

The dispensing device 58 shown in Figures 13 and 15 includes a long tubular casing 115 that is guided by two pairs of guide rollers 116 and is controlled in its vertical movements by a cable 117 connected thereto by a bar 118. Extending through the cylindrical casing 115, is a duct 119 that terminates in a pivotal nozzle 120 that may be swung in a vertical plane through a range of angles.

An air stream with the flock or the filamentous reinforcement material entrained therein is introduced into the duct 119 in a manner to be described hereinafter and is discharged by the pivotal nozzle 120. A smaller spray nozzle 121 is carried by the pivotal nozzle 120 and is connected to a flexible hose 122 that extends longitudinally through the tubular casing 115. Liquid plastic material is supplied by the hose to be sprayed by the nozzle 121. In this instance, the liquid plastic material comprises a polyester resin together with a catalyst.

Preferably the pivotal movement of the flock nozzle 120 is controlled by the mechanism shown in Figure 13. This mechanism includes a longitudinal operating rod 125 that is connected at its lower end to an arm 126 integral with the pivotal nozzle 120 and is connected at its upper end to one arm of a bell crank 127. The bell crank 127, which is pivotally mounted on a suitable bracket 128, carries a follower in the form of a roller 129 that traverses a cam member 130. A suitable coil spring 131 interconnecting the bell crank 127 and the bar 118 continually urges the bell crank in a rotary direction to maintain the follower 129 in contact with the cam member.

The cam member 130 has a rise 132 which causes clockwise rotation of the bell crank 127 when the tubular casing 115 is lowered into the lower end of the mold 50. Thus lowering the dispensing device 58 into the mold by the cable 117 results in swinging of the two nozzles 120 and 121 through a range of positions to deposit flock and liquid resin on the inner surface of the rotating mold in the region of the closed bottom end of the mold. The flock and resin may be discharged simultaneously from the two nozzles 120 and 121 in a single vertical reciprocation of the dispensing device 58, or one of the nozzles may be used in one reciprocation and the other in a subsequent reciprocation of the dispensing device.

The device, generally designated by numeral 135 in Figure 29, that is used for depositing flock in the end of the more pointed tank section 42 comprises a hollow conical perforated member 136 on the lower end of a vertical tubular casing 137. The tubular casing 137 is guided by rollers (not shown) in the same manner as a previously described tubular casing 115 and is supported by a suitable cable in the same manner. The hollow perforated member 136 is connected to a suitable vacuum pump (not shown) by means including a tube 138 that extends longitudinally through the casing 137.

One method of employing the device 135 is to create a vacuum in the hollow perforated member 136 before the device is lowered into the mold and to deposit a suitable layer of flock on the conical surface of the hollow perforated member to be maintained thereon by suction. The hollow perforated member 136 with the deposited layer of flock held thereon by the vacuum is lowered into the bottom of the mold, as shown in Figure 29, and then the vacuum is broken to release the flock to the inner surface of the mold. If necessary, compressed air may be directed into the interior of the hollow perforated member to blow the deposited flock radially outward onto the inner surface of the mold. The deposited flock may then be sprayed with liquid resin by the previously described dispensing device 58, using only the liquid spray nozzle 121 of that device.

It will also be apparent that the flock-resin nose portion of a tank section may also be provided by lowering a pre-form into the mold. For example, with the device 135 outside of the mold and with the conical hollow perforated member 136 under a vacuum, the flock may be deposited on the conical wall of the perforated member to be held thereto by suction and then the deposited flock may be wetted with the liquid resin to form an uncured flock-resin layer or pre-form of conical configuration. This pre-form may be cured before it is lowered into the tank mold or it may be lowered in uncured state. In either event, a vacuum may be maintained inside the hollow perforated member 136 to retain the pre-form thereon until the pre-form is in position to be released inside the mold.

*Means to deposit the remainder of the flock and resin at the second carrousel station*

The dispensing device 60 that may be used at the second carrousel station to form the remainder of the flock-resin layer 65 is shown in Figures 4, 11, and 16. In the preferred practice of the invention, this dispensing device includes a vertical tubular casing 140 that is guided in the usual manner by rollers 116. Unitary with the upper end of the tubular casing 140 is a platform 141 having a vertical triangular wing 142 to which is connected the lower end of a cable 143 that controls the vertical movement of the device. The platform 141 is unitary with a conical hopper 145 that extends into the upper end of the tubular casing 140 to feed material into the upper end of a duct 146 that extends axially through the tubular casing 140. A suitable nozzle 147 connected to a source of compressed air is directed downward into the hopper 145 to project a jet of air into the duct 146 for carrying flock into the interior of the rotating mold 50. Any suitable means may be employed to provide flock for entrainment by the air stream from the nozzle 147.

In the construction shown in Figure 4, a rove 150 supplied from a spool 151 is engaged by a pair of drive rollers 152 for the purpose of feeding the rove to a suitable cutting device on the platform 141. In this instance, the cutting device comprises a rotary cutter 155 actuated by a motor 156. The rotary cutter 155 has spaced radial blades 157 which cooperate with an associated roller 158 to cut the rove 150 into short pieces, say pieces of one inch or one inch and a half in length. It is apparent that this arrangement will provide a constant supply of pieces of flock at a predetermined rate for entrainment by the airstream from the nozzle 147.

The rove 150 may be made by any filamentous material, but in this particular practice of the invention, the rove is made of glass fibers. For example, a commercially available rove may be used, comprising 60 threads with each thread consisting of 208 separate glass filaments.

At the lower end of the tubular casing 140, a tubular arm 160, that is offset as shown, fixedly carries a suitable motor 161 having its driven shaft 162 vertically arranged. A deflector member 163 mounted over the motor has an upwardly extending central conical portion 165 coaxial with the bottom end of the duct 146. It is apparent that the flock-entraining airstream discharged from the lower end of the duct 146 will be diverted in all radial directions by the deflector 163 and that the contour of the deflector will not only keep any flock from accumulating thereon but will also tend to throw the flock radially outward.

Preferably a suitable rotary sleeve 168 is mounted on the tubular arm 160 in the radial region of the deflector 163 to eliminate any tendency whatsoever for the radially projected flock to accumulate on the arm. As shown in cross-section in Figure 11a, the rotary sleeve 168 is formed with suitably shaped peripheral blades 169 so that the rotary sleeve functions as a turbine to rotate at high speed in response to the radially deflected airstream. Thus any material that is deposited on the periphery of the rotary sleeve 168 will be immediately thrown therefrom by centrifugal force to eliminate the possibility of any concentrated masses of flock dropping from the tubular arm.

The tubular arm 160 is an extension of a tube 170 that runs through the tubular casing 140 and terminates at its upper end at the platform 141 as shown in Figure 4. The purpose of this tube is to house a series of three flexible hoses 171 that terminate in three corresponding nozzles 172 at the lower end of the arm 160, as best shown in Figure 11. The three flexible hoses 171 and the corresponding nozzles 172 deliver, respectively, liquid polyester resin, liquid catalyst, and a liquid accelerator or promoter for shortening the duration of the cure.

The liquids from the three nozzles are discharged into a pan-like centrifugal spray head 175 that is open at the top and is formed with a conical inwardly inclined side wall 176. This centrifugal spray head is mounted on the lower end of the motor shaft 162 and may rotate, for example, at 18,000 to 20,000 R. P. M. The centrifugal spray head 175 has a number of circumferentially spaced discharge apertures 177 in the side wall 176. The turbulence created by the discharge of the three liquid streams into the interior of the centrifugal spray head and the turbulence caused by the centrifugal action inside the spray head, result in thorough intermixture of the three liquids to produce a homogenous discharge stream at each of the apertures 177.

With the two drive rollers 152 feeding the rove 150 to the actuated rotary cutter, and with an air jet discharged into the duct 146 by the nozzle 147, it is apparent that the airstream entering the duct will entrain the pieces of flock and that the flock-entraining airstream will be diverted in all radial directions by the deflector 163. With the motor 161 energized, the centrifugal spray head 175 will be rotated at high speed. With the three streams of liquid discharging into the centrifugal spray head, the resultant liquid intermixture will be thrown radially outward towards the inner surface of the rotating tank mold 50. It is further apparent that shifting the dispensing device 60 inside the mold 50 axially thereof will cause the discharged flock and resin to be distributed longitudinally over the inner surface of the mold to form a flock-resin layer continuous with the flock-resin layer previously deposited in the end of the mold. The tumbling of the short pieces of flock in the airstream and the impact of the flock against the deflector 163 causes the flock to separate into its numerous "ends" which are deposited on the surrounding wall of the rotating mold in a random manner. With the flock "ends" and filaments lying in random directions, the filaments are interlaced so that when the deposited flock is wetted by the liquid resin, the random-lying flock filaments are bonded together to resist stresses in all directions. The mold rotates fast enough to cause the flock filaments to remain in position wherever they are deposited, the filaments being immobilized by centrifugal force and by frictional engagement both with each other and with the inner surface of the mold.

While the three flexible hoses 171 may be connected to any type of metering supply means, preferably they are connected to three supply cylinders 180, 181, and 182 containing, respectively, liquid resin, liquid catalyst, and a liquid accelerator. As best shown in Figures 9 and 10, the three cylinders 180, 181, and 182 are supported by a transverse member 183 which, in turn, is supported by a horizontal overhead frame member 184. Each of the three supply cylinders has a corresponding piston 185 joined to a corresponding piston rod 186 and the three piston rods are connected at their outer ends to a transverse bar 190 which serves to actuate the piston rods in unison.

The transverse bar 190 is carried by a non-rotary screw member 191, the threads of which are engaged by a rotary nut 192. The rotary nut 192 is journalled in a suitable bearing 193 and is integral with a sprocket 194 that is controlled by a sprocket chain 195. The sprocket chain 195 is in turn, controlled by a drive sprocket 196 that is actuated by a motor 200. As shown in Figure 10, the shaft 201 of the motor 200 is connected by a coupling 202 to reduction gearing in a gear case 203 and the drive sprocket 196 is actuated by the reduction gearing.

With the three supply cylinders 180, 181, and 182, filled with their respective liquids and with the three pistons 185 positioned therein as shown in Figure 9, energization of the motor 200 will rotate the nut 192 at an appropriate speed. The rotation of the nut 192 causes the screw member 191 to be advanced longitudinally and the resultant movement of the transverse bar 190 causes the three pistons to force liquid material out of the three cylinders at predetermined constant rates.

Figure 12 shows the construction of a dispensing device generally designated 206 that may be substituted for the dispensing device 60 to deposit flock and liquid resin on the inner surface of the rotating mold at the second carrousel station. The device 206 has a tubular casing 207 through which extends a hollow shaft 208. The shaft 208 is preferably positioned on the axis of the tubular casing 207 and has a radial enlargement 210 below the lower end of the tubular casing that is shaped and dimensioned to serve as a deflector. A stream of air entraining the short pieces of flock in the manner heretofore described passes downward through the tubular casing 207 in the annular space surrounding the shaft 208 and is deflected outwardly in all directions by the deflector 210.

A supply tube 211 extends through the shaft 208 to an outer spray chamber 212 on the end of the shaft to spray the interior of the rotating mold with liquid polyester resin; a second supply tube 213 terminates in an intermediate spray chamber 214 to spray liquid catalyst into the interior of the rotating mold; and a third supply tube 215 connects with an inner spray chamber 216 to deliver liquid accelerator to the interior of the rotating mold. The three spray chambers, receiving the liquids under pressure, have peripheral discharge openings at three levels to discharge the three liquids as indicated by the arrows in Figure 12.

The dispensing device, designated 206, would be disposed within the mold at the second carrousel station. With a flock-entraining airstream directed downward through the tubular casing 207, the flock will be thrown radially outward in all directions so that vertical shifting of the dispensing device 206 will result in distribution of the flock over the inner surface of the rotating mold. The three spray heads at the lower end of the shaft 208 may be operated at the same time by supplying the materials under pressure to wet the deposited flock or, if desired, the dispensing device 206 may be shifted axially in the rotating mold for the sole purpose of depositing flock and then may be subsequently shifted for the sole purpose of operating the three spray heads only.

*Means to control the distribution in thickness of the flock and resin*

The distribution in thickness of the flock on the inner surface of the rotating mold will depend upon the rate of discharge of the flock and the rate of vertical shift of the dispensing device. Since both the flock and the resin are discharged at constant rates in the preferred practice of the invention, the distribution and thickness of the flock-resin layer 65 may be controlled solely by regulating the vertical movements of the dispensing device. Thus, if the dispensing device 60, for discharging flock and resin is moved uniformly along the axis of a cylindrical mold of uniform diameter, the resulting flock-resin layer will be of uniform thickness. Another factor must be taken into consideration, however, in this particular practice of the invention since the tank section varies in diameter. If the device 60 were moved axially inside the mold at a constant rate, the thickness of the deposited flock-resin layer would increase in the regions where the diameter of the tank decreases. It is desirable to avoid such increase where not needed, not only to avoid wasting material but also to avoid excessive weight in the finished fuel tank.

In the preferred practice of the invention, automatic means is provided to regulate the vertical movement of the dispensing device 60 either in such manner as to obtain uniform thickness of the flock-resin layer in the regions of decreasing tank diameter or in such manner as to compensate in part for the decreasing diameter. A mechanism which may be used for this purpose is shown in Figures 5, 6, and 7.

The cable 143 which supports the dispensing device 60, passes over two overhead sheaves 220, as shown in Figure 5, and terminates in a counterweight 221 that is sufficiently heavy to outbalance the dispensing device. A control cable 222 that is connected to the cable 143 by a hook 223 is wound onto a spiral body 224, carried by a countershaft 225. The countershaft 225 is journalled in suitable standards 226 on an overhead shelf 230 and carries a suitable sheave (not shown) engaged by a drive belt 231. The drive belt 231 is, in turn, engaged by a drive sheave 232 on the shaft 233 of a motor 234.

The spiral body 224 has a spiral groove in the periphery thereof and one portion 235 of the spiral groove is of uniform diameter while the adjacent portion 236 of the groove is of progressively changing diameter. The control cable 222, which is not shown in Figure 7, is wound onto the spiral body 224 in engagement with the spiral groove, with the end 237 of the cable anchored to the spiral body as indicated in Figure 6. The portion 235 of the groove that is of uniform diameter causes the cable to be wound or unwound at a uniform rate and this portion of the groove corresponds to the straight cylindrical portion of the rotating mold 50. The progressively varying portion 236 of the groove corresponds to the tapering lower end portion of the hollow mold 50 with the diameter of the groove increasing inversely as the diameter of the tank mold. Thus the dispensing device 60 moves vertically at a constant rate in the region of uniform diameter of the mold 50 to cause flock and resin to be deposited thereon to a uniform thickness and the vertical movement of the dispensing device increases in the lower region of the mold to compensate for the decreasing diameter of the mold thereby to continue the deposition of the flock-resin at the same uniform thickness.

It is to be understood, of course, that the spiral configuration of the body 234 may be designed either to under-compensate or over-compensate in various regions of the hollow mold thereby to cause corresponding local increase or decrease in the thickness of the deposited material. It is also apparent that the dispensing device may be caused to slow down or even to pause in its vertical travel in any region where it is desired that the thickness of the tank wall be increased to withstand local concentration of stresses. The pause of the dispensing device 60 may be accomplished, if desired, simply by slowing down or momentarily de-energizing the motor 234 that controls rotation of the spiral body 224. Figure 8 shows how an internal tank rib 238 may be formed by locally increasing the thickness of the flock-resin layer, the rib being formed by momentarily slowing or stopping the axial movement of the dispensing device 60.

*Bag structure for use at the third, fourth, and fifth carrousel stations*

In this particular practice of the invention, it is contemplated that the mold 50 will be strong enough to withstand a vacuum and it is further contemplated that a mandrel 240 will be positioned inside the bag 62, as shown in Figure 28, to reduce the volume of air that must be exhausted for evacuation of the interior of the bag. The mandrel 240 may be of sealed hollow construction as shown, or may be solid, or may be omitted entirely. In this particular practice of the invention, the mandrel is unitary with a closure structure or assembly, generally designated 245. The closure structure 245 closes off the interior of the bag 62 from the atmosphere and is adapted for releasable fluid-tight engagement with the interior of the mold 50 to cooperate with the mold and the bag 62 to form an enclosed space for isolation of the deposited flock-resin layer 65 from the atmosphere. The detailed construction of the closure structure 245 and the associated mandrel 240 may be understood by referring to Figures 24–28.

The closure structure 245 includes a closure plate 246, a ring 247 mounted on the inner or underside of the closure plate, and an expansible rim means including a rim ring 248. The mandrel 240 is spaced radially inwardly from the ring 247 and both the mandrel and the ring are welded to the underside of the closure plate 245 as indicated in Figure 26. Preferably, the mandrel is of double-walled construction with the outer wall perforated. Thus as shown in Figures 25 and 26, a perforated shell of the same configuration as the mandrel but slightly larger, is attached to the ring 247. A suitable nipple 254 for connection to the previously-mentioned pipe 67 (Figure 18), is mounted in the closure plate 245 between the mandrel 240 and the perforated shell 250. This nipple makes it possible either to evacuate the interior of the bag 62 or to place the interior of the bag under atmospheric pressure or higher pressure.

As indicated in Figures 25 and 26, the ring 247 is cut away on its outer circumference to provide a suitable annular groove 255 to receive the rim of the bag 62. The rim portion of the bag is folded over a retaining ring 256 that nests into the annular groove 255, as may be seen in Figures 25 and 26. The rim ring 248 removably embraces the ring 247 and engages the rim of the bag 62 to provide sufficient pressure at the annular groove 255 to seal off the bag from the atmosphere. An angular passage 257 in the rim ring 248 provides communication between a nipple 258 and the space between the bag 62 and the mold 50 to make it possible either to evacuate this space or to place this space in communication with the atmosphere. The nipple 258 is connected to the previously-mentioned pipe 66 (Figure 18).

The function of the rim ring 248 is not only to cooperate with the ring 247 for gripping the rim of the bag 62 in a fluid-tight manner but also to provide fluid-tight engagement with the surrounding mold 50 to seal the space between the bag 62 and the wall of the mold for the purpose of isolating the flock-resin layer 65 from the atmosphere. As shown in the drawing, the rim ring 248 is provided with a relatively wide and shallow peripheral groove 259 in which a circumferential diaphragm 260 is mounted in a sealed manner by a pair of tensioned wires 261. As shown in Figure 27, a second annular passage 265 in the rim ring 248 provides communication between an external nipple 266 and the annular space 267 inside the circumferential diaphragm 260. This external nipple 266 may comprise a truck tire valve to hold compressed air in the annular space 267 for expanding the circumferential diaphragm 260 into fluid-tight engagement with the mold 50.

As shown in Figures 24 and 26, a circumferential series of short bars 268 may be provided for the purpose of securing the rim ring 248 on the closure structure 245 and for the further purpose of permitting the closure structure to engage the rim of the mold 50 to support the mandrel 240 inside the mold. A stud 269 extends upward from the ring 247 into an aperture 270 in each of the bars 268 to receive a pair of retaining nuts 274, and a cap screw 275 extending through a second aperture 276 in each of the bars threads into the rim ring 248.

The manner in which the described closure structure 245 for the bag 62 serves its purpose may be readily understood from the foregoing description. When the bag 62 is lowered into the mold 50 at the third carrousel station, compressed air is introduced through the tire valve 266 to expand the circumferential diaphram 260 for sealing off the interior of the mold. The vacuum pump 70 is then placed in operation in communication with the two pipes 66 and 67 to evacuate the space immediately outside the bag 62 as well as the space immediately inside the bag. The evacuation of the outer sealed annular space which encloses the flock-resin layer 65 results in withdrawal of air from the flock-resin layer and also results in boiling and vaporization of volatile constituents of the layer. The generation of vapor in this manner serves to flush residual air completely out of the region of the flock-resin layer. The simultaneous evacuation of the space inside the bag keeps the bag from being expanded and thereby interfering with withdrawal of air and vapor from the flock-resin layer.

With the space surrounding the bag still evacuated to isolate the flock-resin layer 65 from the atmosphere, it is merely necessary to place the interior of the bag into communication with the atmosphere to cause the bag to be expanded into contact with the flock-resin layer 65 thereby to subject the layer 65 to desirable pressure during the curing of the resin. To place the interior of the bag into communication with the atmosphere, it is merely necessary to manipulate the three-way valve 74 to place the pipe 67 in communication with the pipe 75. This step is illustrated by Figure 19.

The pressure by the bag 62 against the surrounding flock-resin layer 65 is continued at the fourth carrousel station where the heater 76 is placed in communication with the shroud 52 to raise the layer to a curing temperature. At the end of the curing period, the tire valve 266 is opened to deflate the circumferential diaphragm 260 and the bag structure is lifted away from the mold.

The initial deposit of the flock of glass fibers may, for example, approximate one inch in thickness and the wetting of the flock by the resin may cause the layer to contract, for example, to about three-eighths of an inch in thickness. The subsequent admission of atmosphere into the interior of the bag 62 may then compress the wet flock to a thickness on the order of one-tenth inch. The thinnest parts of the final plastic wall may be on the order of .09 inch thick and in the regions where the tank wall is to be subjected to stresses when the tank is placed in service, the thickness may be increased to .12 inch.

If desired, the interior of the bag 62 may be placed under higher than atmospheric pressure, say a pressure of 100 lbs. per sq. inch and the amount of resin that is used to wet the flock may be reduced. The increased pressure with reduction in the quantity of resin results in greater density and greater strength in the finished product.

*The preferred bag material*

The bag 62 may be made of various rubber-like materials in various practices of the invention. In this instance, where the molded product is made of polyester resin, the bag 62 must be made of a suitable stretchable material that will not swell by reason of the styrene in the polyester and that will not inhibit the cure of the polyester. Natural rubber is not satisfactory because it will swell. The bag may be made out of a silicone-rubber or may be made out of nylon.

In the preferred practice of the invention, the material of the bag 62 comprises a film of polyvinyl alcohol. The raw material is polyvinyl alcohol in the form of a fine power and preferably a grade is used that is hydrolyzed to less than the usual degree. Preferably the powder is sifted to eliminate relatively large particles and then the powder is mixed with methanol together with a plasticizer and sufficient water to obtain a mixture suitable for spraying. The parts by weight for the spray mixture may be:

1 part polyvinyl alcohol
1 part glycerine (the plasticizer)
3½ parts water
12 parts methanol The preferred procedure for preparing the spray mixture is first to mix the powder with about half of the methanol to form a creamy paste in which all of the powder particles are coated by and suspended in the methanol. The remaining six parts of the methanol is then mixed with the glycerine and water apart from the paste and then this liquid is poured into the paste and the whole is agitated to obtain a homogenous spray mixture.

The mixture is sprayed on a form of the configuration of the desired bag and some of the methanol is lost by evaporation in the spraying process so that the deposit on the form is of mushy character. The deposited coat may then be dried by infra-red lamps. The glycerine is essential to give the bag stretch but with this amount of glycerine, the polyvinyl alcohol must be incompletely hydrolized to keep the bag from sweating.

*A fabrication procedure using thin light molds*

A feature of the invention is that the described fabrication procedure may be carried out with a mold that is too thin to withstand a vacuum. In this instance, for example, it is possible to use a light sheetmetal fuel tank section as a mold for forming a plastic tank section of the same configuration. To illustrate this practice of the invention, Figure 30 shows a mold 41a in the form of a sheet metal tank section to be used for molding the previously described polyester tank section 41.

The mold 41a is held upright by the usual radial plates 53 in a cylindrical shroud 52a that is of sufficient strength to withstand atmospheric pressure. The shroud 52a may be ribbed for strength if necessary. The shroud 52a is adapted to be sealed off from the atmosphere to serve as a bell jar enclosing the mold 41a.

In the construction shown, the shroud 52a is enclosed by a dished cover 280 having a nipple 281 therein for connection with a suitable vacuum pump. The rim of the shroud 52a is formed with a radial flange 282 to seat the dished cover 280 and is provided with an upstanding cylindrical flange 283 for centering the cover on the radial flange. A suitable sealing gasket 284 makes the juncture between the cover and the shroud fluid-tight.

With the flock-resin layer 65 deposited on the interior surface of mold 41a in the manner heretofore described, the closure structure 245 is placed in the mold and then is expanded into fluid-tight engagement with the mold by inflation of the circumferential diaphragm 260. As can be seen in Figure 30, the pipe 254 in the closure structure 245 that communicates with the interior of the bag 62 in the region of the mandrel 240 is open to the interior of the shroud 52a and the pipe 66 that communicates with the annular space surrounding the bag between the bag and the mold is connected by a hose 290 with a nipple 291 in the wall of the shroud.

To carry out the step of withdrawing air and vapors from the layer 65, the nipple 281 of the dished cover 280 and the nipple 291 of the shroud 52a are both connected to a suitable vacuum pump for simultaneous evacuation of both the interior and the exterior of the bag. Subsequently the cover nipple 291 is opened to the atmosphere and the cover removed but a vacuum is maintained through the nipple 291 to cause the bag 62 to exert the desired pressure against the layer 65 for the duration of the cure period.

*Use of the process for other products*

Figure 31 shows how a mold 295 of square cross-section may be employed in the above-described manner to form a hollow body of corresponding configuration. With the dispensing device for depositing the flock and resin moving along the axis of the mold while the mold is rotating, the thickness of the deposited flock-resin layer 296 will vary wtih the radial distance of the mold wall from the axis. As a result, the four sides of the molded product will be of tapering thickness as shown.

Such a molded product may be cut longitudinally into flat pieces. Thus the process may be used to form flat pieces that taper in thickness. The taper shown in Figure 31 is along one dimension, but it is apparent that the longitudinal movement of the means for depositing the flock and resin may be controlled to result in a taper in the longitudinal dimension as well. The same longitudinal taper effect may also be obtained by moving the dispensing means uniformly in a mold of a square cross-sectional configuration that progressively changes in cross-sectional dimension. In other words, the longitudinal tapering effect can also be obtained by using a longitudinally tapering square mold.

Figure 32 indicates how the process may be utilized to produce rectangular flat sheets of uniform thickness. It is merely necessary to use the process in the manner heretofore described to produce a molded cylinder 300 of uniform diameter. The molded cylinder is then severed longitudinally along the line 301 and the severed cylinder is rolled flat to form the flat sheet 302, by a "post-forming" operation.

Figure 33 shows how a cylinder may be produced with a wall of tapering cross-section. If a cylindrical form 305 is rotated on its longitudinal axis in the manner heretofore described and the flock and resin are discharged from an eccentric axis 306, the thickness of the deposited flock-resin layer 307 will vary inversely with the distance of the inner surface of the mold from the eccentric axis 306. As a result, the flock-resin layer 307 will be tapered as shown. The resulting cylinder may be severed longitudinally along the line 310 and then the wall of the cylinder may be flattened to provide a sheet of corresponding tapered thickness.

Our description in detail of selected practices of the invention will suggest various changes, substitutions, and other departures from our disclosure that properly lie within the spirit and scope of the appended claims.

We claim:

1. A method of forming a hollow reinforced plastic body, including the steps of: rotating a hollow mold of the desired configuration about an axis passing through the mold at a speed to cause material to cling to the inner surface of the mold by centrifugal force; directing a gaseous stream inside the hollow rotating mold towards the inner surface of the mold; entraining short filaments of reinforcement material in said stream for deposit thereby on said inner surface of the rotating mold with the deposited filaments interlaced in random directions; wetting the deposited reinforcement material with uncured plastic thereby forming a layer of reinforced uncured plastic material; and curing said layer.

2. A method of forming a hollow reinforced plastic body, including the steps of: rotating a hollow mold of the desired configuration about an axis passing through the mold at a speed to cause material to cling to the inner surface of the mold by centrifugal force; directing a gaseous stream inside the hollow rotating mold towards the inner surface of the mold; moving a multiple-filament strand of reinforcement material longitudinally at a substantially constant rate; cutting said strand into short pieces along its path of movement to supply short filaments of the reinforcement material at a substantially constant rate; directing said supply of short filaments into said gaseous stream to be entrained thereby and deposited thereby on said inner surface of the mold with the deposited filaments interlaced in random directions; wetting the deposited filaments with uncured plastic material thereby forming a layer of reinforced uncured plastic material; and curing said layer.

3. A method as set forth in claim 2 in which said strand is composed of glass fibers.

4. A method of forming a hollow body having a conical end, characterized by the use of a hollow mold having a conical end, said method including the steps of: positioning a preformed hollow conical end member in said conical end of the mold; rotating the mold on its longitudinal axis at a rate to cause material on the inner surface to cling thereto by centrifugal force; depositing material including uncured resinous material on the inner surface of the rotating mold to build up a layer continuous with said end member; and curing said layer to form a wall united with said end member.

5. A method as set forth in claim 4 in which said end member is composed at least partly of uncured plastic material and is cured simultaneously with said layer.

6. A method of forming a hollow body of reinforced plastic material with a conical end by means of a hollow mold of corresponding conical configuration, including the steps of: holding a layer of reinforcement flock on a perforated cone by maintaining a partial vacuum inside the cone; positioning said cone in the conical end of the mold and terminating the vacuum to release said flock to the mold to form a conical layer in the conical end thereof; rotating said mold at a rate to cause flock to cling to the inner surface of the mold by centrifugal force; directing a stream of reinforcement flock onto the inner surface of the rotating mold to form a layer continuous with said conical layer; wetting the layer of reinforcement flock with liquid plastic material; and curing said layer.

7. A method of fabricating a hollow object of reinforced plastic material, including the steps of: rotating a hollow mold of the desired configuration about an axis passing through the mold; directing a stream of air into the hollow mold longitudinally thereof; introducing flock into said stream to be entrained thereby; deflecting said longitudinal stream laterally at a point inside the mold toward the surrounding inner surface of the rotating mold to cause the flock to be deposited thereon and to cause the deposited flock to be immobilized thereon by centrifugal force; and shifting the point of deflection of said stream longitudinally of the rotating mold to distribute the flock in a layer over the inner surface of the mold; wetting the layer of flock on the rotating mold with liquid plastic material; and curing the plastic material.

8. In an apparatus of the character described for forming a hollow body of material that is at least partially a plastic material, the combination of: a hollow mold having an opening at one end; means to rotate the mold about an axis passing through said open end at a rate to cause material to cling to the inner wall of the mold by centrifugal force; means to direct at least one stream of the material including said plastic onto the inner surface of the mold while the mold is rotating thereby to build up a layer of material thereon; a bag of flexible material for positioning inside said mold and for expansion by fluid pressure into pressure contact with said layer; means to connect said bag with said mold in a fluid-tight manner to enclose a space around the bag, said space including said layer; means to evacuate said space to remove gaseous fluids from said layer; means to evacuate the interior of said bag to keep the bag from presssing against said layer while the gaseous fluids are being removed therefrom, and a body for positioning inside said bag for reducing the volume of air therein to facilitate evacuating the interior of the bag and to provide a form against which the bag may be collapsed by fluid pressure for separation of the bag from said layer.

9. An apparatus as set forth in claim 8 in which said body has two spaced outer walls, the outermost of which is foraminous for communication between the outer surface of the outer wall and the space between the two walls.

10. In an apparatus of the character described for forming hollow bodies of a material that is at least partially a plastic, the combination of: conveyor means, a series of molds on said conveyor means to be carried thereby to a series of stations in sequence for a cycle of operation; means to rotate said mold at some of said stations early in said sequence at rates to cause material to cling to the inner surfaces on the molds by centrifugal force; means at one of said earlier stations to direct at least one stream of plastic material into the rotating molds for deposit on the inner surfaces of the molds thereby forming layers of the configuration of the desired hollow bodies, means to position bags in the molds at one station and to remove the bags at a later station; means for connecting the positioned bags to the molds in a fluid-tight manner to form sealed spaces around the bags enclosing said layers; means to evacuate said spaces to remove gaseous fluids from said layers; and means to expand the connected bags by fluid pressure to place the layers under pressure for a curing period.

11. An apparatus as set forth in claim 10 which includes means to seal off the interior of said bag and means to evacuate said interior.

12. An apparatus as set forth in claim 10 which includes means at a late station in said sequence to heat said molds rapidly to a relatively high temperature for expansion of the molds to free the molded product therefrom.

13. An apparatus as set forth in claim 11 which includes a body inside said bag to reduce the volume of air space in said interior and to serve as a form against which the bag may be collapsed by fluid pressure to separate the bag from the cured layer.

References Cited in the file of this patent

UNITED STATES PATENTS

| | | |
|---|---|---|
| 1,592,536 | O'Neill | July 13, 1926 |
| 2,285,370 | Staelin | June 2, 1942 |
| 2,346,784 | Pollack | Apr. 18, 1944 |
| 2,408,038 | Brennan | Sept. 24, 1946 |
| 2,644,198 | Crawford | July 7, 1953 |

FOREIGN PATENTS

| | | |
|---|---|---|
| 869,082 | France | Jan. 23, 1942 |